(12) United States Patent
Green et al.

(10) Patent No.: US 8,489,065 B2
(45) Date of Patent: Jul. 16, 2013

(54) MOBILE DEVICE CONTROLLER APPLICATION FOR ANY SECURITY SYSTEM

(76) Inventors: Robert M Green, Phoenix, AZ (US); Nicholas J Basil, San Diego, CA (US)

( * ) Notice: Subject to any disclaimer, the term of this patent is extended or adjusted under 35 U.S.C. 154(b) by 0 days.

(21) Appl. No.: 13/405,333

(22) Filed: Feb. 26, 2012

(65) Prior Publication Data

US 2012/0282974 A1 Nov. 8, 2012

Related U.S. Application Data

(63) Continuation of application No. 13/347,838, filed on Jan. 11, 2012, now abandoned, which is a continuation of application No. 13/316,544, filed on Dec. 11, 2011, now abandoned, which is a continuation of application No. 13/197,783, filed on Aug. 4, 2011.

(60) Provisional application No. 61/482,199, filed on May 3, 2011.

(51) Int. Cl.
   *H04M 11/04* (2006.01)

(52) U.S. Cl.
   USPC ...................................... 455/404.1; 348/143

(58) Field of Classification Search
   USPC ..... 455/404.1, 404.2, 410, 557, 566; 70/57.1; 700/231, 236, 237; 709/224; 715/702, 720, 715/736, 863, 864; 340/10.5, 500, 506, 539.11, 340/539.16, 539.17, 539.18, 539.19, 540, 340/571; 345/168, 173; 348/143, 155; 379/39; 396/427

See application file for complete search history.

(56) References Cited

U.S. PATENT DOCUMENTS

| | | | |
|---|---|---|---|
| 7,248,161 | B2 | 7/2007 | Spoltore et al. |
| 7,262,690 | B2 | 8/2007 | Heaton et al. |
| 7,633,385 | B2 | 12/2009 | Cohn et al. |
| 7,724,131 | B2 | 5/2010 | Chen |
| 7,746,224 | B2 | 6/2010 | Addy |

(Continued)

FOREIGN PATENT DOCUMENTS

| | | |
|---|---|---|
| EP | 1564700 | 2/2005 |
| GB | 2454070 | 10/2008 |

(Continued)

OTHER PUBLICATIONS

Unknown, Interactive Home Security, iControl Networks, 2011, Redwood City, California.

(Continued)

*Primary Examiner* — Ping Hsieh

(57) ABSTRACT

A method for using any mobile device to manage a security system in retail environments is disclosed in which an application or applet is installed on the mobile device providing a GUI for users to easily perform functions allowable by the security system. This method can be added to any legacy security system providing remote control and monitoring of the system via two-way communication links. Methods for processing touch inputs on mobile devices for security management are disclosed, including reading data from a multipoint sensing device such as a multipoint touchscreen, and identifying at least one multipoint gesture based on data from the multipoint sensing device. These functions provide vast improvements in retail security by providing store personnel earliest possible theft detection, higher level theft prevention than previously possible, communication between mobile devices in security systems, and evidence provided to law enforcement faster than ever possible.

19 Claims, 12 Drawing Sheets

U.S. PATENT DOCUMENTS

| | | |
|---|---|---|
| 7,840,912 B2 | 11/2010 | Elias et al. |
| 7,855,635 B2 | 12/2010 | Cohn et al. |
| 7,869,824 B2 * | 1/2011 | Min ............................. 455/550.1 |
| 7,911,341 B2 | 3/2011 | Raji et al. |
| 2005/0146606 A1 * | 7/2005 | Karsenty et al. .............. 348/143 |
| 2006/0001537 A1 | 1/2006 | Blake et al. |
| 2007/0076095 A1 | 4/2007 | Tomaszewski |
| 2007/0159323 A1 | 7/2007 | Rockefeller |
| 2007/0205888 A1 | 9/2007 | Lee et al. |
| 2008/0101789 A1 | 5/2008 | Shamar |
| 2008/0211775 A1 * | 9/2008 | Hotelling et al. ............. 345/168 |
| 2008/0272910 A1 * | 11/2008 | Anderson ..................... 340/540 |
| 2009/0181640 A1 * | 7/2009 | Jones .......................... 455/404.2 |
| 2009/0231122 A1 * | 9/2009 | Yeung et al. ................. 340/524 |
| 2009/0243834 A1 * | 10/2009 | Sennett et al. ................ 340/506 |
| 2009/0292989 A1 | 11/2009 | Matthews et al. |
| 2010/0099461 A1 | 4/2010 | Rahfaldt et al. |
| 2010/0118144 A1 | 5/2010 | Fawcett et al. |
| 2010/0148966 A1 | 6/2010 | Vuppala et al. |
| 2010/0153853 A1 * | 6/2010 | Dawes et al. ................. 715/736 |
| 2010/0281161 A1 * | 11/2010 | Cohn et al. .................... 709/224 |
| 2011/0065459 A1 | 3/2011 | Cheng et al. |
| 2011/0107220 A1 | 5/2011 | Perlman |

FOREIGN PATENT DOCUMENTS

| | | |
|---|---|---|
| JP | 2007-008678 | 1/2007 |
| JP | 2009-202219 | 9/2009 |
| JP | 2009-205350 | 9/2009 |
| WO | WO/0106791 | 1/2001 |
| WO | WO0106791 | 1/2001 |
| WO | WO/02061706 | 8/2002 |
| WO | WO/2004066590 | 8/2004 |
| WO | WO/2010/080821 A1 | 7/2010 |
| WO | WO/2010080821 | 7/2010 |
| WO | WO2010080821 | 7/2010 |
| WO | WO/2010128177 | 11/2010 |
| WO | WO2010128177 | 11/2010 |
| WO | WO/2011035066 | 3/2011 |

OTHER PUBLICATIONS

Unknown, "Your Smart Phone Just Got Smarter", ADT, 2011, Boca Raton, Florida.
Unknown, Home Security SmartPhone Apps, Alarm.com, www.alarmsystemreviews.com.
Unknown, Business Wire Press Release, May 18, 2008, New Orleans, Louisiana.
Unknown, Untitled, SmartHome Superstore Irvine, California.
Unknown, Keystone Security Systems, Rochester, New York.
Unknown, "You're a smart business", 2011, Vienna, Virginia.
Unknown, "Leveraging the Value of imaging in enterprise mobility applications", Motorola, Libertyville, Illinois.
Unknown, "Home Security Smart Phone Apps", www.alarmsystemreview.com.
IControl Networks, "Home Security Redefined," www.icontrol.com.
ADT Security Services, "ADT Pulse," www.ADTpulse.com.
Unknown, Interactive Home Security, iControl Networks,2011, Redwood City, California.
Unknown, Your Smart Phone Just Got Smarter, ADT, 2011, Boca Raton, Florida.
Unknown, Untitled,SmartHome Superstore, Irvine, California.
Unknown, You're a smart business, 2011, Vienna, Virginia.
Unknown, "Leveraging the Value of imaging in eneterprise mobility applications", Motorola, Libertyville, Illinois.

* cited by examiner

Figure 7
Sample Icons
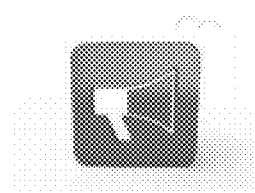
Activate Alarm Immediately
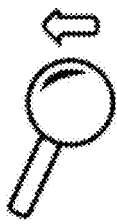
Initiate Image Search
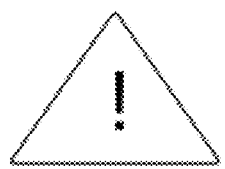
Activate Alert Mode to all Mobile Devices LOGIN                                                                                           Figure 8
Screen Controls
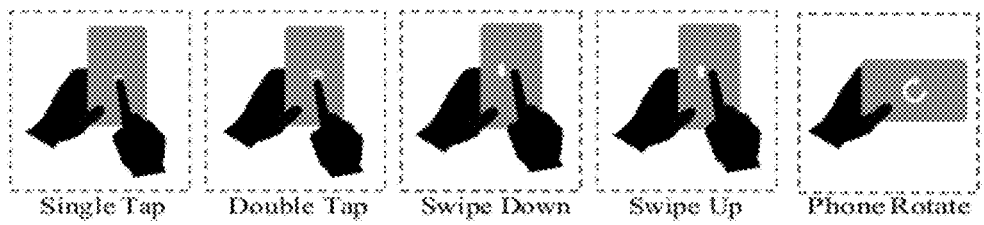
Single Tap   Double Tap   Swipe Down   Swipe Up   Phone Rotate Multi-Camera list Screen                                      Figure 9
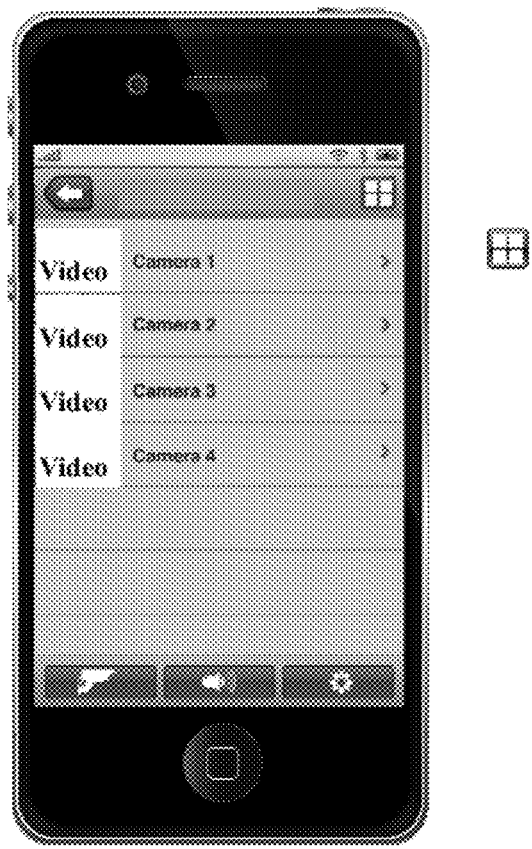
Screen Controls
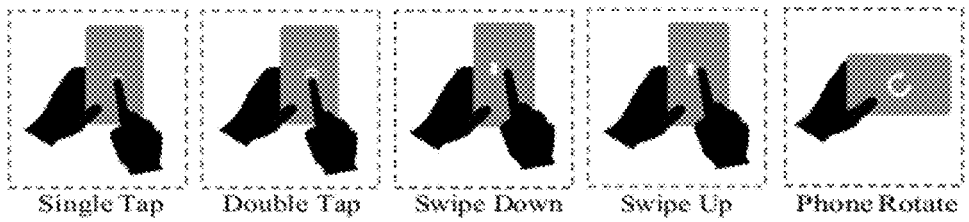
Single Tap    Double Tap    Swipe Down    Swipe Up    Phone Rotate Multi-Camera View Screen                                Figure 10
Screen Controls
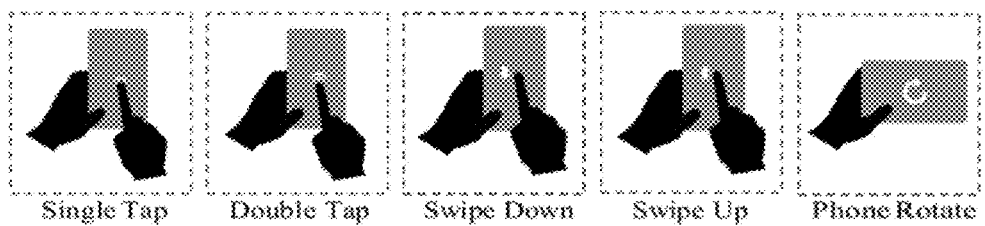

LARGE Camera View Screen                                  Figure 11
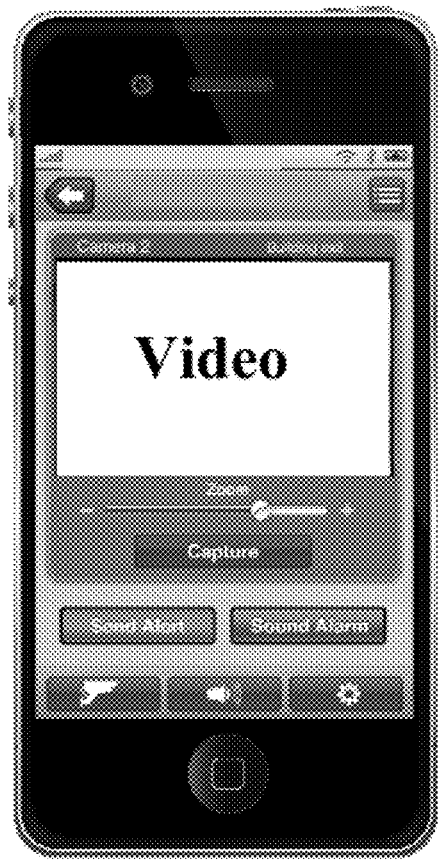
Screen Controls
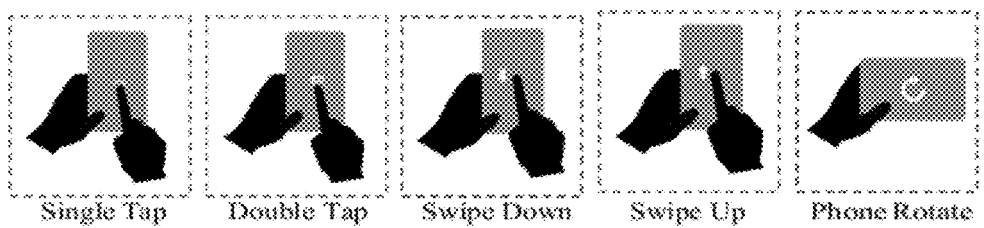
Single Tap    Double Tap    Swipe Down    Swipe Up    Phone Rotate Alert Screen                                                                 Figure 12
Screen Controls
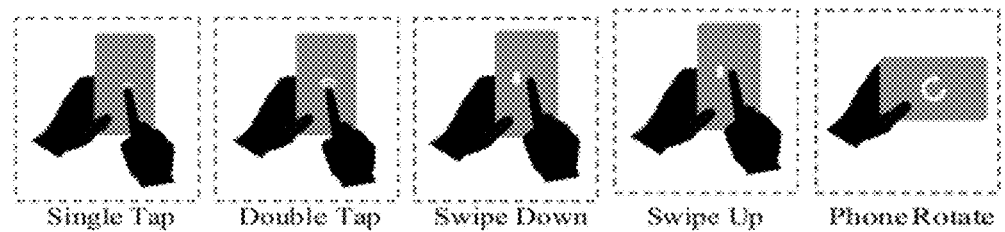
Single Tap    Double Tap    Swipe Down    Swipe Up    Phone Rotate

MOBILE DEVICE CONTROLLER APPLICATION FOR ANY SECURITY SYSTEM

CROSS-REFERENCE TO RELATED APPLICATIONS

This application is a continuation of non-provisional application Ser. No. 13/347,838, filed on Jan. 11, 2012, non-provisional application Ser. No. 13/316,544, filed on Dec. 11, 2011, non-provisional application Ser. No. 13/197,783, filed on Aug. 4, 2011, and claims benefit of provisional application 61/482,199, filed on May 3, 2011.

BACKGROUND OF THE INVENTION

Field of Invention

Background of Invention

It has been proposed to send streaming video to smartphones, mobile, cellular, PDA, or any portable device or portable computing device, from retail security systems such that the user of a smartphone, typically a retail store manager or security personnel, can view streaming video and alert messages in real time or quickly after an event has occurred that triggered a security and alarm system. While sending video clip files has been done before, it has not been possible to have the system initiated by store personnel using a smartphone, have the ability to use gestures on a touch screen smart phone to provide the most intuitive and fast method of operating the security system, or to have the ability for one smartphone user to be able to alert other smartphone users.

The present invention is directed towards mobile management of retail theft security systems, particularly in EAS, RFID, and any commercial use security system that uses surveillance camera or video systems. More particularly, the present invention provides system management capabilities using portable device or portable computing devices.

Portable device or portable computing devices are being widely used for storing, manipulating, and exchanging data. A portable device or portable computing device can be an intelligent or unintelligent device based on the presence or absence of data processing capability in the device. Intelligent portable device or portable computing device include, but are not limited to, smartphone, mobile phone, laptop, tablet PC, Personal Digital Assistant (PDA). Several technologies and systems exist to send alert messages in various formats to mobile devices or smartphones. However, these messages and alerts often get lost in the multitude of messages that typical users receive on their phones. Further, in order for store security or management personnel to change any settings on the security controller software, or to view different cameras, or any other administration function, they have to be where the computers, DVR, or Video Surveillance systems are physically located in order to make such changes allowable by their software.

In light of the abovementioned limitations, there is a need for a system and method that facilitates real time management of a theft detection system such that a store employee that is trained and tasked with any administration access and changes to the system should be able to do using a wide variety of intelligent and unintelligent portable device or portable computing devices.

The present disclosure embodies a number of aspects that can be implemented separately from or in combination with each other. Any existing security system typically has software controls via a GUI or other method that allows store personnel or systems administrators to view or make changes to the security system. A user can modify various functions of a security system using a smartphone, PDA device or tablet PC via wireless WiFi network or cellular communications. A user can also send and receive alarm alerts, as well as view the current status and operate cameras.

One principal target of this invention is a retail store that uses any type of existing security system. This invention provides both an improved method of managing the security system and an improved method of having retail store personnel proactively view the security system and set desired parameters in their existing system.

While the preferred embodiments of the invention have been described above, it will be recognized and understood that various modifications may be made therein and the appended claims are intended to cover all such modifications that may fall within the spirit and scope of the invention.

DEFINITION OF TERMS

The following term definitions are provided to assist in conveying an understanding of the various exemplary embodiments and features disclosed herein.

SMS

Short Message Service (SMS) is the text communication service component of phone, web, or mobile communication systems, using standardized communications protocols that allow the exchange of short text messages between fixed line or mobile phone devices

MMS

Multimedia Messaging Service, or MMS, is a standard way to send messages that include multimedia content to and from mobile phones. It extends the core SMS (Short Message Service) capability that allowed exchange of text messages only up to 160 characters in length.

PDA

A personal digital assistant (PDA), also known as a palmtop computer, or personal data assistant, is a mobile device that functions as a personal information manager. Current PDAs often have the ability to connect to the Internet. A PDA has an electronic visual display, enabling it to include a web browser, but some newer models also have audio capabilities, enabling them to be used as mobile phones. Many PDAs can access the Internet, intranets or extranets via Wi-Fi or Wireless Wide Area Networks.

URL

In computing, a Uniform Resource Locator (URL) is a Uniform Resource Identifier (URI) that specifies where an identified resource is available and the mechanism for retrieving it. In popular usage and in many technical documents and verbal discussions it is often incorrectly used as a synonym for URI.

Smartphone

A smartphone is a mobile phone that offers more advanced computing ability and connectivity than a contemporary feature phone. Smartphones and feature phones may be thought of as handheld computers integrated with a mobile telephone, but while most feature phones are able to run applications based on platforms such as Java ME, a smartphone usually allows the user to install and run more advanced applications. Smartphones run complete operating system software providing a platform for application developers. Thus, they combine the functions of a camera phone and a personal digital assistant (PDA).

Portable Computing Device, Mobile Computing Device

Mobile computing is a form of human-computer interaction by which a computer is expected to be transported during normal usage. Portable Computing Device and Mobile Computing Device shall have the same meaning in the specifications and claims. Mobile computing has three aspects: mobile communication, mobile hardware, and mobile software. The first aspect addresses communication issues in ad-hoc and infrastructure networks as well as communication properties, protocols, data formats and concrete technologies. The second aspect is on the hardware, e.g., mobile devices or device components. The third aspect deals with the characteristics and requirements of mobile applications.

Many types of mobile computers have been introduced since the 1990s including the:
  Wearable computer
  Personal digital assistant/enterprise digital assistant
  Smartphone
  Carputer
  Ultra-Mobile PC
  Tablet computer
  iPad
  A watch with broadband access, touch screen technology, capability to run custom applications, capability to send or receive messages or signals, or any combination thereof.

Remote Device or Mobile Device or Portable Device or Portable Computing Device

For the purposes of this document, "remote device" or "mobile device" shall mean any remote device that is portable and has either phone, computing, or internet access capability, including but not limited to: a smartphone, or any mobile, cellular, PDA, or portable device or portable computing device as previously defined.

Streaming Media, Streaming Video

Streaming media is multimedia that is constantly received by and presented to an end-user while being delivered by a steaming provider. The name refers to the delivery method of the medium rather than to the medium itself. The distinction is usually applied to media that are distributed over telecommunications networks, as most other delivery systems are either inherently streaming (e.g., radio, television) or inherently non-streaming (e.g., books, video cassettes, audio CDs). The verb 'to stream' is also derived from this term, meaning to deliver media in this manner. Internet television is a commonly streamed medium.

Live streaming, more specifically, means taking the media and broadcasting it live over the Internet. The process involves a camera for the media, an encoder to digitize the content, a media publisher where the streams are made available to potential end-users and a content delivery network to distribute and deliver the content. The media can then be viewed by end-users live.

RTSP

RTSP, or Real Time Transfer Protocol, is a standard for controlling streaming data, video, or media on the World Wide Web. RTSP is designed to efficiently broadcast audiovisual data to large groups.

RSS (Most Commonly Expanded as Really Simple Syndication)

RSS is a family of web feed formats used to publish frequently updated works—such as blog entries, news headlines, audio, and video—in a standardized format. An RSS document (which is called a "feed", "web feed", or "channel") includes full or summarized text, plus metadata such as publishing dates and authorship. Web feeds benefit publishers by letting them syndicate content automatically. They benefit readers who want to subscribe to timely updates from favored websites or to aggregate feeds from many sites into one place. RSS feeds can be read using software called an "RSS reader", "feed reader", or "aggregator", which can be web-based, desktop-based, or mobile-device-based. A standardized XML file format allows the information to be published once and viewed by many different programs. The user subscribes to a feed by entering into the reader the feed's URI or by clicking a feed icon in a web browser that initiates the subscription process. The RSS reader checks the user's subscribed feeds regularly for new work, downloads any updates that it finds, and provides a user interface to monitor and read the feeds. RSS allows users to avoid manually inspecting all of the websites they are interested in, and instead subscribe to websites such that all new content is pushed onto their browsers when it becomes available.

IM (Instant Messaging)

Instant messaging (IM) is a form of real-time direct text-based communication between two or more people using personal computers or other devices, along with shared clients. The user's text is conveyed over a network, such as the Internet. More advanced instant messaging software clients also allow enhanced modes of communication, such as live voice or video calling.

Touchscreen

A touchscreen is an electronic visual display that can detect the presence and location of a touch within the display area. The term generally refers to touching the display of the device with a finger or hand. Touchscreens can also sense other passive objects, such as a stylus. Touchscreen is common in devices such as computers, tablet, and smartphones.

The touchscreen has two main attributes. First, it enables one to interact directly with what is displayed, rather than indirectly with a cursor controlled by a mouse or touchpad. Secondly, it lets one do so without requiring any intermediate device that would need to be held in the hand. Such displays can be attached to computers, or to networks as terminals. They also play a prominent role in the design of digital appliances such as the personal digital assistant (PDA), satellite navigation devices, mobile phones, and video games.

Gesture

A Gesture is a touch or movement on a computing or mobile device that operates as commands to the device or to software on the device. On touchscreen displays, multi-touch refers to the ability to simultaneously register three or more distinct positions of input touches. It is often used to describe other, more limited implementations, like Gesture-Enhanced Single-Touch, Dual-Touch or real Multi-Touch. The interaction of touch and movement on surfaces is a function on electronic visual displays and touchpad pointing devices to interact with content. It is an intermediary connection and detection method from hardware to computer software, to enact a user's intention.

Air Gesture

An Air Gesture is similar to a Gesture as defined above, except that there is no contact required on a touch screen display on a mobile device. An Air Gesture is able to use a screen on a mobile device or portable computing device without direct contact, and can perform all of the same functions performed by Gestures.

Splash Screen

A splash screen is an image that appears while a software application program is loading. It may also be used to describe an introduction page on a website. Splash screens sometimes do not cover the entire screen, but only a rectangle near the center. The splash screens of operating systems and some applications that expect to be run full-screen usually cover the entire screen.

Pop Up

Pop-ups are a form of a splash screen typically used on the World Wide Web intended to attract web traffic or capture email addresses. Pop-ups are generally new web browser windows to display advertisements. The pop-up window is usually generated by JavaScript, but can be generated by other means as well.

Alert Condition

A state in the security system in which mobile device users are notified of a potential theft situation.

Alarm Condition

A state in the security system in which mobile device users are notified of a theft in progress, and the security software controller activates any programmed alarm state parameters including but not limited to higher definition surveillance video and audible alerts. An alarm condition may be set automatically be a triggering event, or manually by a mobile device user.

Voice Actions

Voice Actions are a series of spoken commands that let you control your phone using your voice

SUMMARY OF THE INVENTION

The present invention is intended to provide a method of managing a retail based security system. Many types of security systems are deployed in retail environments today, mostly based on EAS (Electronic Article Surveillance), and a camera or video surveillance system. RFID (Radio Frequency Identification) is most commonly used for inventory control and supply chain management, but is becoming more commonly used in security. Typically, most of these systems provide audible alarms when a theft is detected, and some provide alert messages to mobile or PDA devices that are used by store management or security personnel. In a few available systems a video clip is sent via RTSP or video streaming for live real time viewing by the store personnel that are getting the security system alerts. EAS systems have become so commonplace and have so many false alarms, that they are more often ignored and provide less of theft deterrence today than several years ago when they were adopted very quickly in retail stores.

One object of the present invention is to allow authorized users of the system to make more use of the system by being able to view any of the installed cameras on a mobile device, rather than having to sit in a room where the security systems are physically located. This convenience will get authorized store personnel more aware of the installed security system and to improve the use of such system to help reduce theft Another object of the invention is to provide an application, or applet, on a mobile or PDA device or portable computing device such that the user of such mobile device or smartphone can use any systems administration functions of the security system including testing, checking different cameras, exits, aisles, or other locations of RFID readers or cameras, positioning the zoom, pan, tilt, direction, or frames per second of the cameras, setting alert parameters, live viewing of video, ability to search for events on a video, and the ability to do a system test and arm or disarm the system, activate the alarm, and alert other store personnel that are provided mobile for access to the security system. Alerts provided by either the main security system, or by another mobile user, may be presented by a splash screen or pop up which adds a speed and urgency of notification novel and not previously seen in security management.

In addition, what is most novel in the use of the smartphone application for security is the use of touch inputs, or gestures, on a multipoint touch screen. The user will be able to graphically see the entire security system design, and will be able to use different gesture inputs to activate different functions of the security system, such as setting an alarm, zooming, panning, or rotating a surveillance camera, and alerting other users of the smartphone application in the retail store.

The invention also relates to a touch-based method. The method includes outputting a GUI on a display. The method also includes detecting a user input on a touch sensitive device. The method further includes analyzing the user input for characteristics indicative of tracking, selecting or a gesturing. The method additionally includes categorizing the user input as a tracking, selecting or gesturing input. The method further includes performing tracking or selecting in the GUI when the user input is categorized as a tracking or selecting input. Moreover, the method includes performing control actions in the GUI when the user input is categorized as a gesturing input, the actions being based on the particular gesturing input. It should be noted that in each of the embodiments described above, the methods may be implemented using a touch based input device such as a touch screen or touch pad, more particularly a multipoint touch based input device, and even more particularly a multipoint touch screen. Air Gestures are also used in the same manner as touch Gestures. Finally, an option is provided for user customization of gesture inputs specific to security system management such that an individual user may use a dictionary of gestures provided by the mobile device manufacturer or other available software in order to most comfortably navigate the security system quickly and efficiently.

BRIEF DESCRIPTION OF THE SEVERAL VIEWS OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIG. 7 shows a few examples of how icons from FIG. 4 would be defined on one or more screens. These sample icons would perform the functions described.

FIG. 8 shows a sample of what the login in screen would look like. A user name and password is required to log in to the security system.

FIG. 9 shows the multi camera view of streaming video with multiple cameras on one screen. This screen shows available cameras in a list view so the user can switch the view with the top right icon. The user can view the camera details by touching the arrow on the right hand side of the screen; this will take the user to the camera details screen.

FIG. 10 shows a multi camera view with camera names and small icons with controls that allow the user to select a camera view to occupy the full screen. After clicking on the top right button of the list view, the user comes to this multi camera view screen. The user can see multiple camera screens at once and can touch each view and make it a live video feed. The user can then activate the camera and use zoom and pan features if authorized as an administrator to use those functions.

FIG. 11 shows the large camera view on the screen, the ability to use gestures to zoom, sent alerts to other mobile devices, activate the alarm, or select an image capture to send to an image database such as the FBI database in order to search for identification or criminal history. Other features include the ability to zoom in or out of the camera in the large view, tap on other cameras, send alerts, and access other standard buttons.

FIG. 12 shows the alert screen when a user receives an alert, both pop up and audible, and the ability to zoom in to the camera from which the alert was activated. Alerts pop up when another user sends an alert; the user can view or cancel the alert.

DETAILED DESCRIPTION OF THE INVENTION

Figure 1:
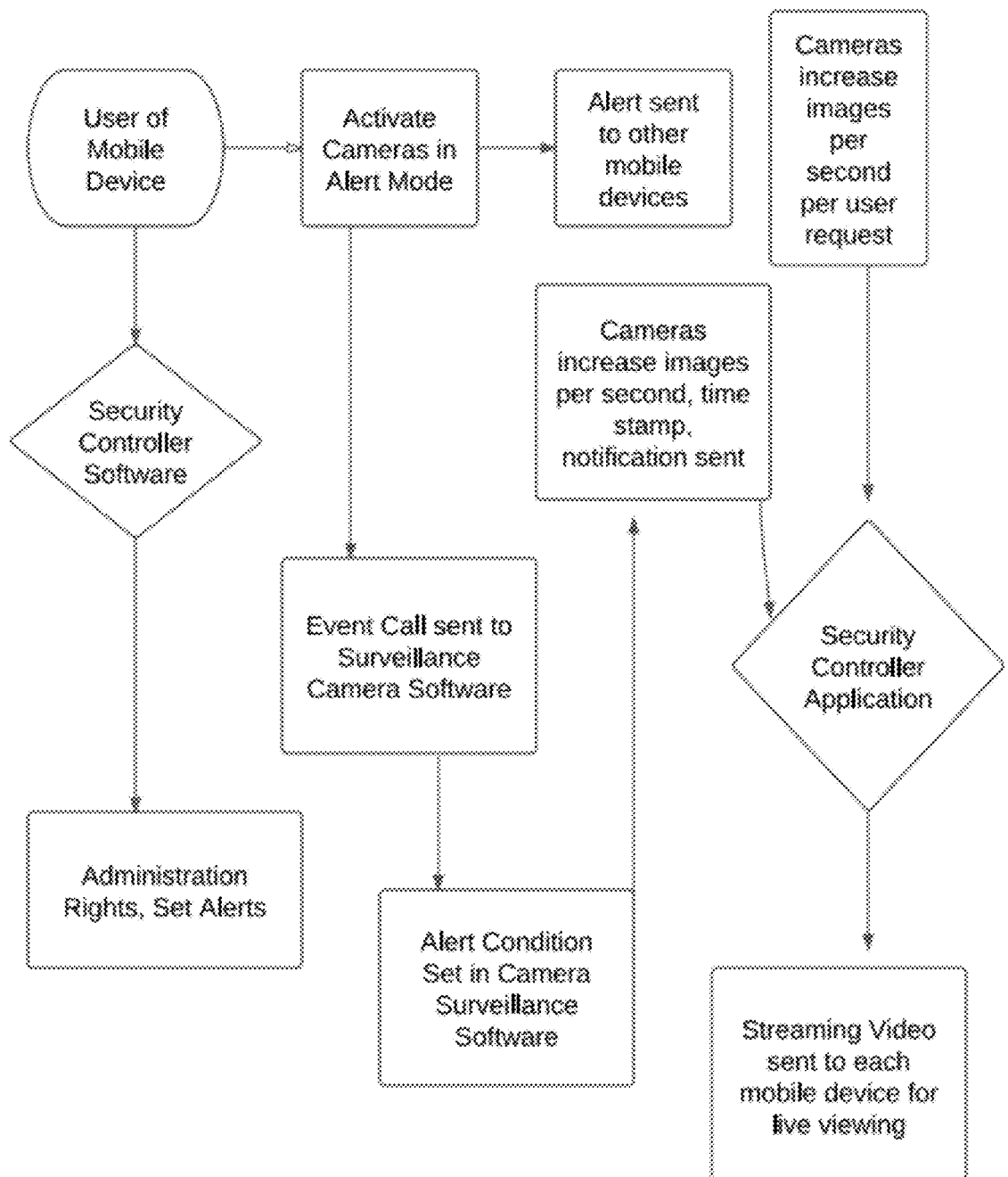
FIG. 1 is a block diagram showing the process of how the mobile device application user accesses the security system controller to perform administration functions, and to activate one or more cameras in "alert mode" which sends a splash screen message and streaming video to other mobile devices using the security system.
Figure 2:
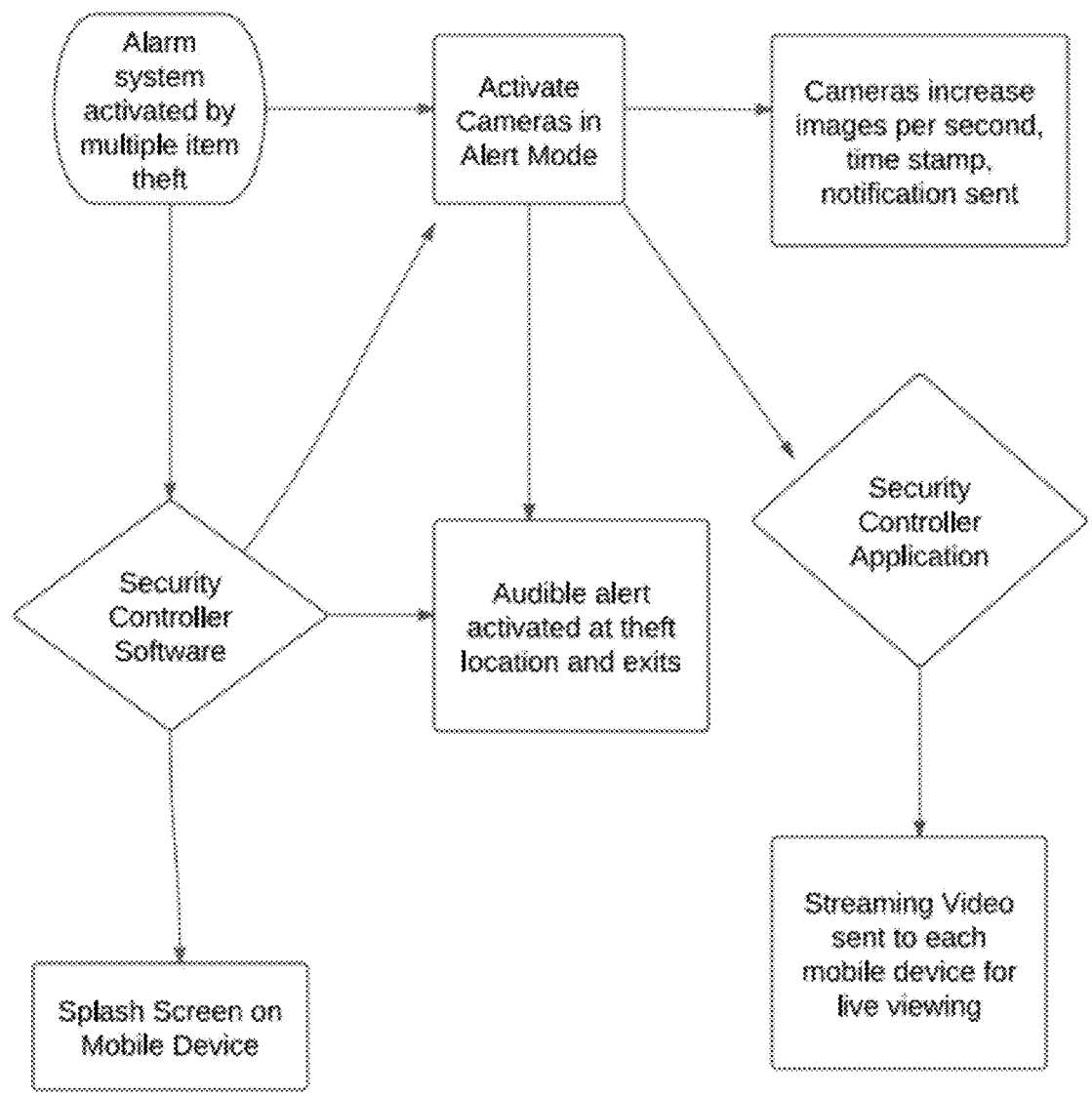
FIG. 2 is a block diagram showing the process of events when an alarm is automatically activated by a theft.
Figure 3:
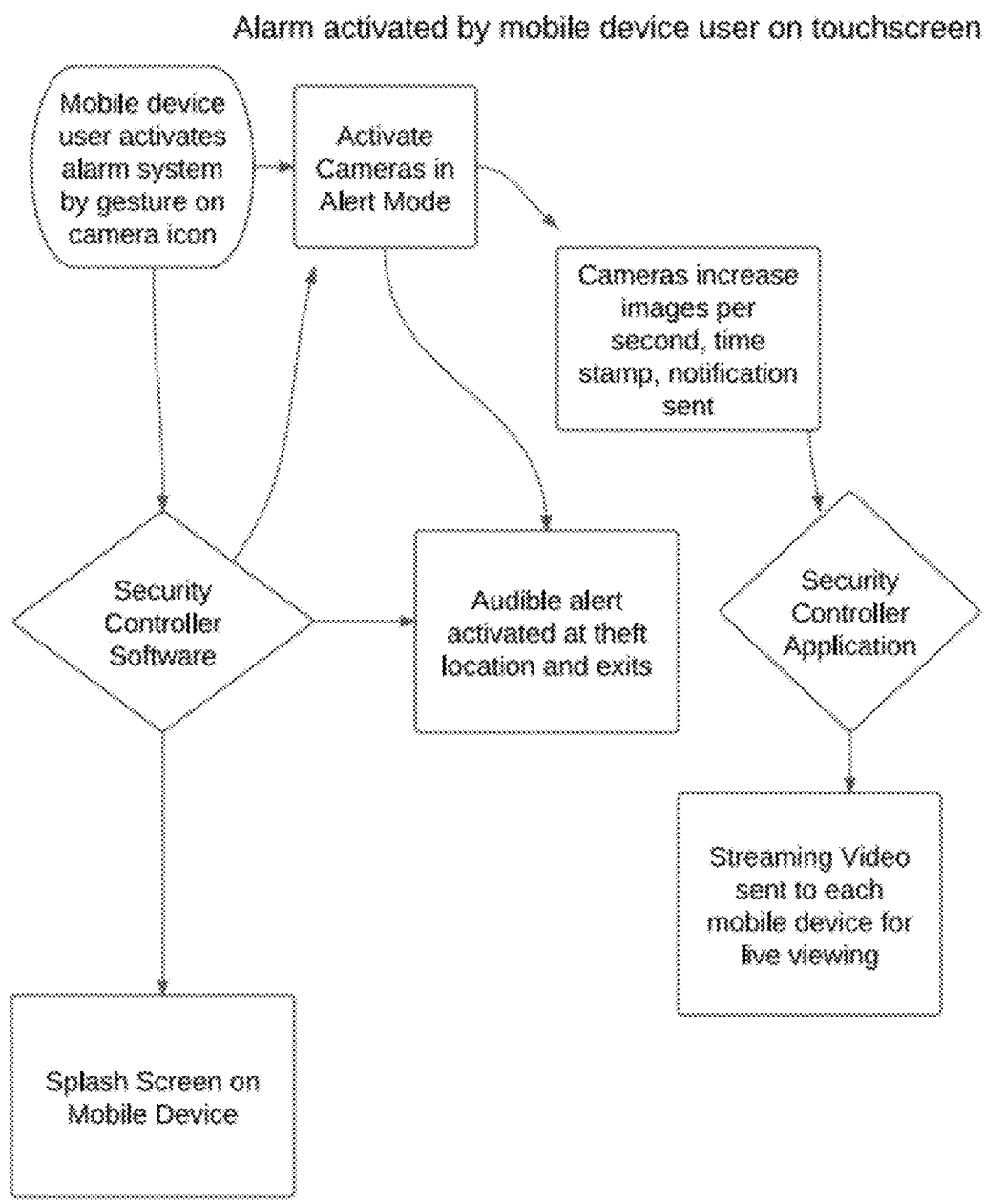
FIG. 3 is a block diagram showing the process of events when an alarm is manually activated by a mobile device user.
Figure 4:
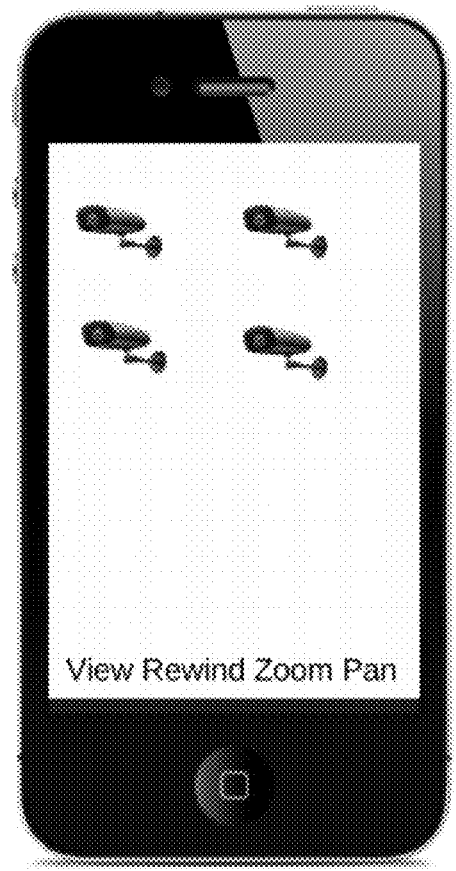
FIG. 4 is a representation of a view of the store security system and where surveillance cameras are located, along with sample icons that allow the mobile device user to perform other defined functions.
Figure 5:
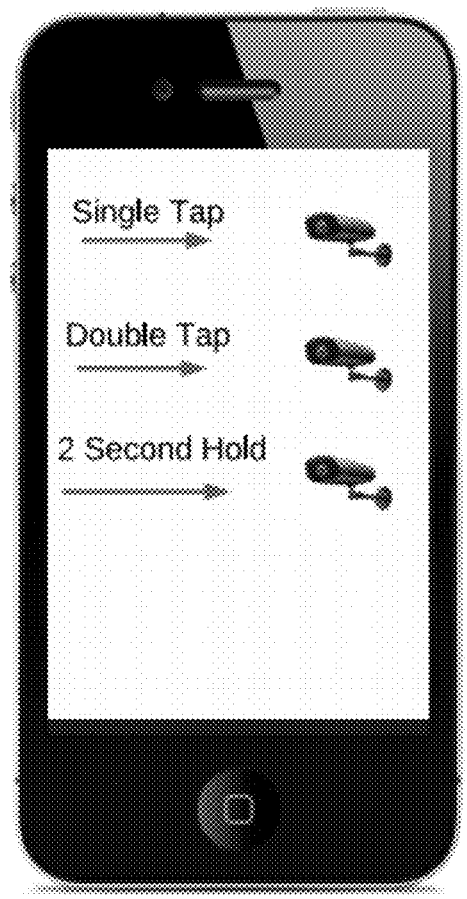
FIG. 5 is a representation of how Gestures are used on a camera icon to perform different functions, in the sample case setting the alert or alarm mode.
Figure 6:
FIG. 6 is a representation of a splash screen or pop up alert message or alarm message.

1 Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

2 Theft is an ever present concern of the retail industry in stores such as grocery stores, pharmacies, department stores, or general merchandise retail stores. Many such stores have invested in EAS security systems which has become a defacto standard in retail security. Unfortunately, due to the high rate of false alarms, reduced personnel at many retail chain stores, and concern about the ability to apprehend suspected shoplifters, very often little is done with these security systems; Many skilled and experienced shoplifters are very aware of how to avoid setting off the audible alert by removing the EAS tags prior to exiting the store, or are aware that store personnel do not go to the door when the audible alert is activated, and they do not chase the shoplifters outside of the store area. Of particular concern is enhancing the value and functionality of existing security systems by allowing store security personnel, management, or other targeted employees to have the ability to monitor and in some cases control the security system outside of the room where the equipment is located by use of a mobile device or portable computing device. This type of capability will allow the store employees to be more aware and actively involved in security and loss prevention, and allow them to proactively use the system to monitor store activity and make adjustments to the system as needed by having administrative control of the system via an application or applet on their mobile device.

3 The mobile device user will install an application or applet onto the smartphone, mobile device or portable computing device, and through use of a GUI, have generally the same controls that a system administrator has that is located at the security controller server accessing the system with a computer. In addition, the user has the ability to control any camera that is able to be controlled by the security software controller, such as tilt, direction, pan, zoom, frames per second, or any other allowed setting.

4 Another aspect of this invention is to activate the alarm condition in the camera surveillance system via the application on the mobile device or portable computing device if the user (store security or store manager) suspects a theft is in progress.

5 Another aspect of this invention is to activate any audio recording capability in the mobile device or portable computing device in a case where the user of such a device activates the alarm condition.

6 Another aspect of this invention is the ability to generate any reports that the security system can generate such that the mobile device user can view on their mobile device.

7 Another aspect of this invention is how alerts will be sent. A mobile user has the option to either activate the alarm, or activate a warning of suspicious activity. In both cases, an alert message can be sent directly to all users of the mobile device application so that the closest employees will be able to possibly prevent the theft before it occurs, or in the case of a retail store that employs security guards, to apprehend the suspects after a theft has occurred. Another novel aspect of alerts is how messages are sent. While email and SMS have been used for some time, their effectiveness has waned as mobile device users receive more messages than ever. With the security application installed and activated on the mobile device, an alert will activate a splash screen or pop up, along with an audible alert, so that the mobile device user will see the alert no matter what he is currently doing with the device, and in addition, may use alternate messaging technologies such as RSS, MSS, and IM (instant messaging).

8 Another aspect of this invention is the availability of an API, or Application Programmers Interface, such that the manufacturer of any security system will be able to interface to and customize the smartphone security application for use in their system.

9 Another aspect of this invention is the use of a splash screen or pop up. This new security system alert is more efficient and seen faster than any previous method of alert or notification that has been used. In addition to a splash screen, an audible alert on the mobile device will be used to ensure the user is aware of the alert. The type, volume, and duration of audible alert will be configured by the individual user and selected from the library of alert sounds and ringtones provided by the mobile device manufacturer, or alternately any audible alert that can be used by downloading free sounds or ringtones, or purchasing sounds or ringtones, from any available website. The splash screen or pop up may be activated either automatically by a theft detection system, or manually by a mobile device user.

10 Another aspect of this invention is the GUI that shows a layout of the surveillance cameras on the mobile device. This allows the user to tap an icon of any particular camera to view the streaming video from said camera, and the ability to activate an alarm condition, and further to use a drag gesture to activate an alarm condition in any camera to follow any selected suspects or perpetrators. The mobile device user is able to view live streaming video data sent from the surveillance system via RTSP or any other video streaming technology, on any selected camera, and in addition may select to lower the frames per second of the video surveillance system in order to have less data being transferred to the mobile device. The user may also view video from a previous period of time by selecting the desired time period in the GUI of the application.

11 Another aspect of this invention is to allow one or more individual mobile device users the ability to run a system test, deactivate and reactive the alarm system if needed, and further to rewind the stored video on any particular camera to view previous activity.

12 Another aspect of this invention is the use of gestures on a touch screen or multipoint touch screen. The application user will be able to activate and view a specific camera by pressing on the icon image of that camera in the GUI representation, set the alarm mode by double tapping on an alarm icon or on the camera icon, and activating a video trail by dragging a finger across the screen from camera icon to camera icon. Further, the application will support air gestures such that gestures can be used to activate any icon or trigger event without having to touch the screen.

13 Another aspect of this invention is the activation and use of unstructured media data search on stored video files. The mobile device user can hold an image of a person, for example, for 2 seconds to activate the data search using industry provided software algorithms such as that provide by Autonomy, where the stored video files will be searched to find a match to the selected imaged such that the mobile device user can then select to view historic video to determine if a suspect has been involved in a previous theft. One option is to send the captured image to an outside database such as the FBI database, in order to identify a suspect. The results of such search are sent to the mobile user via splash screen alert whereby the user can select the option to view streaming video.

14 Another aspect of the invention is the use of pre-defined gestures wherein the user of the mobile device, or any device with a multipoint touch screen, can select screens, activate features, or set conditions by those defined gestures. Further, the user can choose and use any dictionary of gestures, chords, motions, or air gestures that is provided by the manufacturer of the mobile device. In addition, the application will allow for the user to define his own set of personal gestures for each function such that the user is able to use gestures that feel more natural than those provided as standard. The user also can define the graphical representation of the main menu options that lead to a following screen such as cameras, system test, alarm activation, audio recording, alert mode, or any other function available by use of gestures such as screen touch, holding touch, swipe, or air gestures.

15 Another aspect of the invention is the use of Voice Actions wherein the user of the mobile device, or any device that has the capability to use voice actions, can select screens, activate features, or set conditions by the use of spoken commands.

16 Another aspect of the invention is the ability for the mobile device user to create a video clip file with date and time stamp to show and send to law enforcement mobile devices.

17 A final aspect of the invention is the capability for the mobile device user to link to a GPS receiver if such GPS receiver exists in the security controller application, and if GPS receivers are used in any type of merchandise that is stolen as a means of tracking the item or perpetrator of the theft.

What is claimed is:

1. A mobile device or portable computing device comprising a software application program that has two way access to a security system software controller, where such security system is used in a multi-location environment of two or more locations including retail stores, or business offices, to perform all functions that would be allowed to an authorized user as if the user were using the security system where the equipment is physically located and using a manufacturer provided GUI, wherein the receiving capabilities of the remote device are receiving alerts via any electronic means, including but not limited to SMS, MMS, RSS, IM, or voice call, or wherein the system management capabilities of the software application (applet) installed on the mobile device, smartphone, or portable computing device, is any feature or configuration option that would normally be allowed to the authorized user as if the user were using the security system where the security equipment is physically located and using the manufacturer provided GUI, wherein the management capabilities include: setting alert message types, parameters, and recipients of such alert messages and sending messages directly to other mobile device users using the application, viewing live streaming video or any media of any camera the user chooses, deactivating and reactivating the system, performing a system test, changing any parameters of an individual camera such as pan, zoom, tilt, direction, and frames per second, and to put the security system in an alarm condition if the authorized user has identified a possible alarm condition that may or may not be in a location that the installed security system is use, and to check any available reports that may be created or generated by the security system; and the mobile device allows the user to use pre-defined gestures on a touch screen, or use air gestures, to operate the application including a single tap on any icon to activate said icon function and move to an appropriate screen, the ability to view a graphical representation of the security system whereby the user can use zoom, pan, and scroll functions on the touch screen to view any desired portion of the graphically represented security system, to view live streaming video from any camera by one gesture touch or air gesture on said camera, to activate an alarm condition on any camera, to view live streaming video from any camera by a double tap gesture touch or air touch on said camera, to activate an alarm condition on any camera by a holding gesture touch or holding air touch on said camera, and by activating an alarm condition on multiple cameras either by holding gesture touch or holding air touch on multiple cameras, or by dragging a finger on the touch screen, or dragging a finger via air touch, to choose a path of cameras the user will activate.

2. The mobile device or portable computing device as in claim 1, wherein a custom application is provide that is integrated into the security system via remote access such that the mobile device user can perform any functions that are allowed by the security system.

3. The mobile device or portable computing device as in claim 1, wherein the security system controller software is located either locally in the store or remotely accessible via the internet, and where the remote device is accessing the security system controller software via any means by which the remote device has communications access capabilities, and further, where the mobile device user has the same access rights and system administrator functions as would be seen when using the security software application from a local computer or any system provided by the security system manufacturer.

4. The mobile device or portable computing device as in claim 1, wherein the application will activate a splash screen or pop up and an audible alert when an alarm condition is activated by the security controller software, or alternately when an alarm condition is activated by a mobile device user such that an alert message will be sent from the user's mobile device to all other mobile device users with the mobile device security application installed, and further, where such notification is in the form of a splash screen or pop up and concurrent audible alert, or alternately may use RSS, MSS or Instant Messaging (IM) as a means of communication between mobile device, or between the security controller and mobile devices.

5. The mobile device or portable computing device as in claim 1, wherein the application gives the user the ability to watch live steaming video of any installed camera, video camera, DVR, CCTV, and any other image capturing system wherein the security system is sending streaming video using streaming video technology, including but not limited to RTSP, and further, wherein the application on the mobile device give the user the ability to watch streaming video in the same manner from a previous period in time from stored video files by selecting the start time the user requests to begin from, and further, where the mobile device user may set a state in the security system to activate less frames per second of the streaming video in order to reduce the amount of data being transferred.

6. The mobile device or portable computing device as in claim 1, wherein the application gives the user the ability to set an alarm manually so that the security system will go into an alarm state in the same methodology as existing automated methods in which alarms are triggered, and further can set one or multiple cameras to be in such an alarm state until such alarm state is ended by the mobile device user, and further where such alarm activated by a mobile device user will automatically send an alert message, splash screen, or pop up to all other mobile or portable devices defined in the security software controller in which said devices have the same application or applet installed; alternately, a user will be able to active an alert mode such that all other mobile devices or portable computing devices will receive an alert in the form of a splash screen or pop up with a concurrent audible alert, where such alert is a warning to observe for a possible theft.

7. The mobile device or portable computing device as in claim 1, wherein the application gives the user the ability to control any camera that is able to be controlled by the security software controller, with such controls being tilt, direction, pan, zoom, frames per second, or any other setting that the controller software allows.

8. The mobile device or portable computing device as in claim 1, wherein the application gives the user a GUI (graphical User Interface) showing the location of every camera or video recorder, wherein the user may touch one graphically represented camera on the mobile device and be able to view live video or any media streaming from that camera, and further, in the case of a theft, the ability to provide the video file to law enforcement immediately without the need to use the video surveillance system.

9. The mobile device or portable computing device as in claim 1, wherein the application gives the user the ability to set, edit, or modify any alert or alarm conditions, and the destination and message type of any alert message used by the security system controller, including but not limited to a splash screen or pop up and audible alert at any or all other mobile devices in use in the retail store environment.

10. The mobile device or portable computing device as in claim 1, wherein the application gives the user the ability to link to a GPS receiver if such GPS receiver exists in the security controller application, and if GPS receivers are used in any type of merchandise that is stolen as a means of tracking the perpetrator of the theft.

11. The mobile device or portable computing device as in claim 1, wherein the application gives the user the ability to run any available system test on the security controller, and if authorized, to deactivate and activate the security system.

12. The mobile device or portable computing device as in claim 1 that has two way access to a video surveillance system in which such program can be put into an immediate alarm mode where the video surveillance system is activated in an alarm condition, and the software application on the mobile device or portable computing device is able to activate an audio recording feature on all mobile devices if available such that any audible events that are within range of the mobile device are recorded.

13. The mobile device or portable computing device as in claim 1 that has two way access to a video surveillance system in which such program has an administrative function that can control all other users of the software application program in which administrator rights were given, and where all such portable devices or portable computing devices can be put into an immediate alarm mode by any authorized user of a portable device or portable computing device, where the video surveillance system is activated in an alarm condition, and the software application on the mobile device or portable computing device is able to activate an audio recording feature if available such that any audible events that are within range of the smartphone or portable device or portable computing device user is recorded.

14. The mobile device or portable computing device as in claim 1 that allows an authorized user to control the main security or video surveillance system controller that manages remote systems and is located either at a corporate data center or hosted at a data center of a security company or any other service provider.

15. The mobile device or portable computing device as in claim 1 that allows a user to use voice actions to control the application on the mobile device to activate any feature of the security system, if such voice actions are available in the mobile device or portable computing device, including but not limited to, setting an alarm, sending alert messages, activating cameras, or any action of the security system for which the user has authorized access.

16. The mobile device or portable computing device as in claim 1, wherein the user can activate any specific camera to view the live streaming video or other media and with the use of a touch screen gesture or air gesture of holding a desired image of a person or persons for 2 seconds, or any user defined gesture, activate an unstructured data search of archived video files stored on the surveillance server, or at a data center that is storing archived video file, to check for prior activity and video or image of the person or persons that the device user is looking for.

17. The mobile device or portable computing device as in claim 16, wherein the results of the video search with any attached video files or images are sent to the mobile or portable device by activating a splash screen or pop up wherein the mobile device user can view the one or more video clips or images by a single tap gesture on the presented screen, or air gesture, and where an additional icon is presented on the screen such that the mobile user can instantly activate an alarm event and the alarm system with a double tap gesture or air gesture to such icon, and whereby all current and archived video clips or images are time stamped and available for access on the security controller server, accessible via mobile device, and available to be sent to any law enforcement office via electronic means using video streaming technology, or to any law enforcement mobile device or portable computing device by the request to the mobile device user sending the request and instructions to the security controller software server.

18. The mobile device or portable computing device as in claim 1 that allows the user to define a personal dictionary of gestures or air gestures such that the user chooses the number of screen touches or air gestures or the length of time of a holding touch or holding air touch of a desired function is needed to activate that function, and to further define the graphical presentation of the main menu options that lead to a following screen, including but not limited to cameras, system test, alarm activation, audio recording, alert mode, or any other graphically represented interface in the application software that has a function or leads to a next screen by use of gestures such as screen touch, holding touch, swipe, or air gestures.

19. The mobile device or portable computing device as in claim 1 that allows the user to choose and use any dictionary of gestures, multi-touch gestures, chords, motions, or air gestures, or any other method of using the graphical user interface of the mobile device or portable computing device, that is provided by the manufacturer of said device, or by any third party application that may be available for use on said device, and further, the application will allow the user to set the desired audible alert from the dictionary of audible alerts provided by the mobile or portable device manufacturer, or to use any audible alert that can be downloaded or purchased, such as ringtones.

* * * * *